Figure 1:
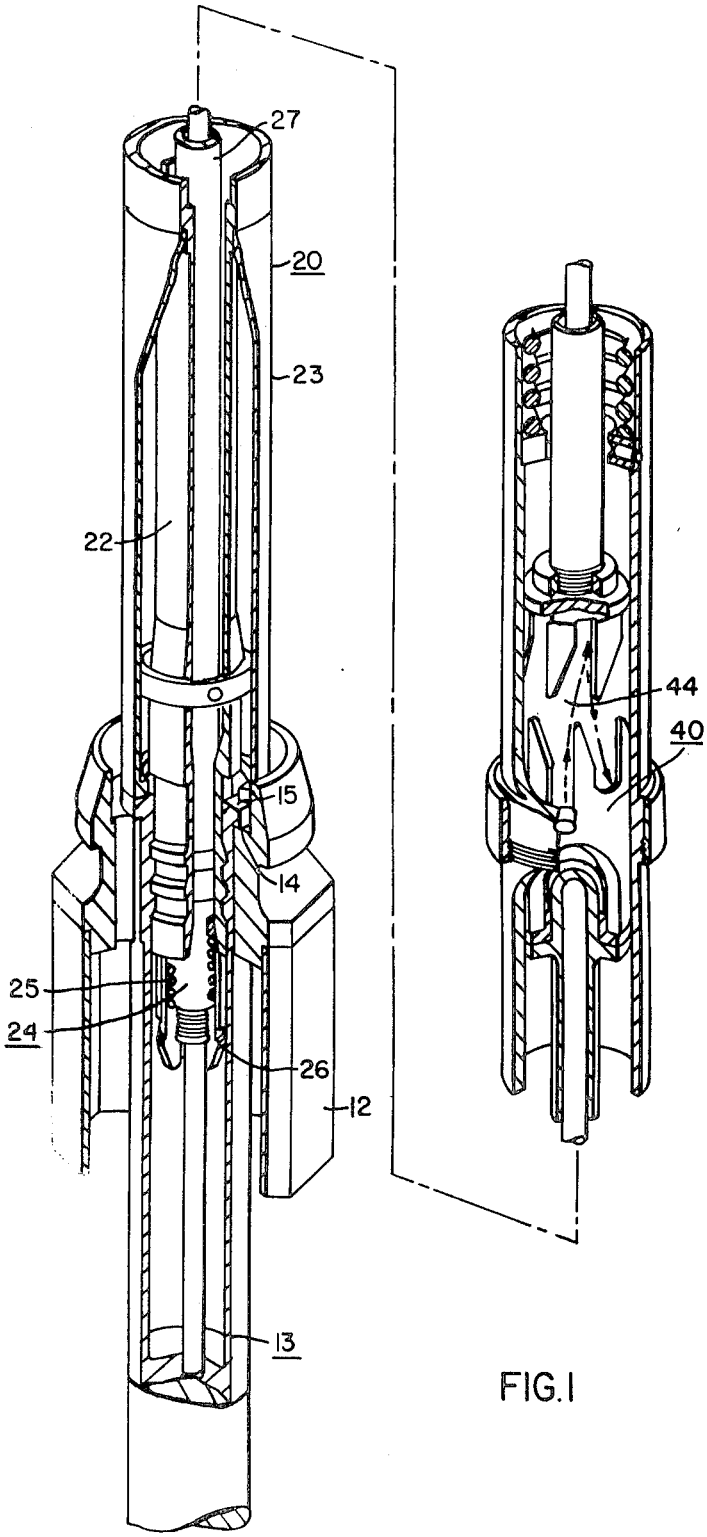
Figure 2:
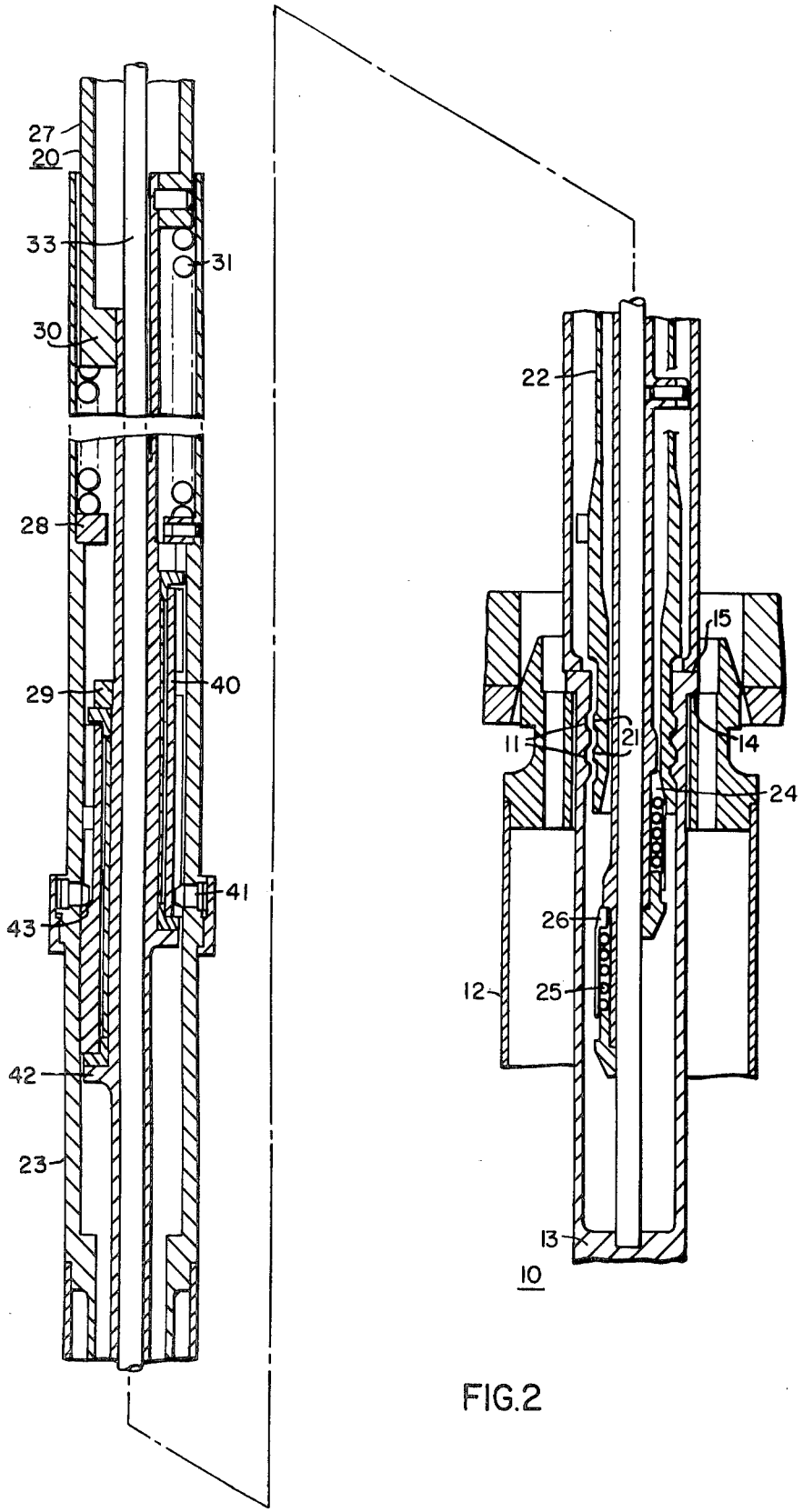
Figure 3:
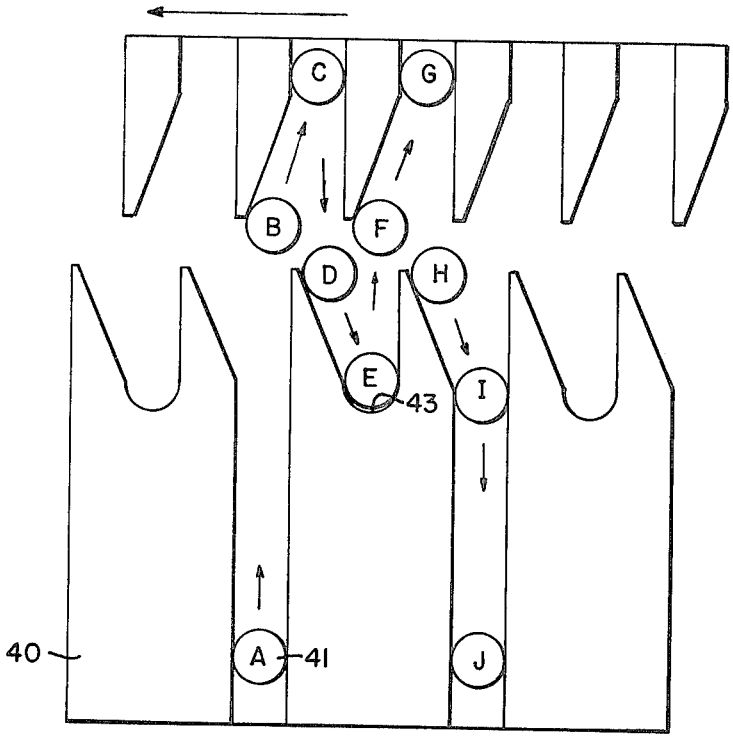
Figure 4:
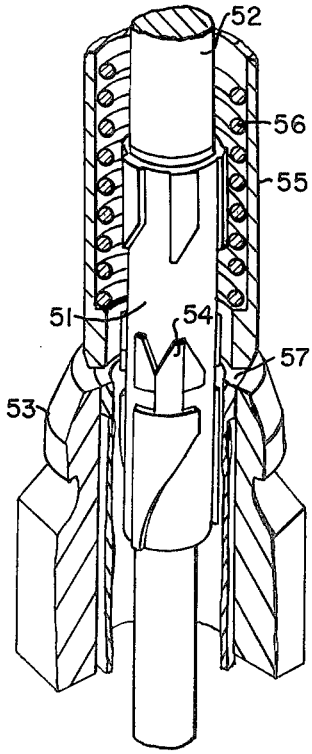
Figure 5:
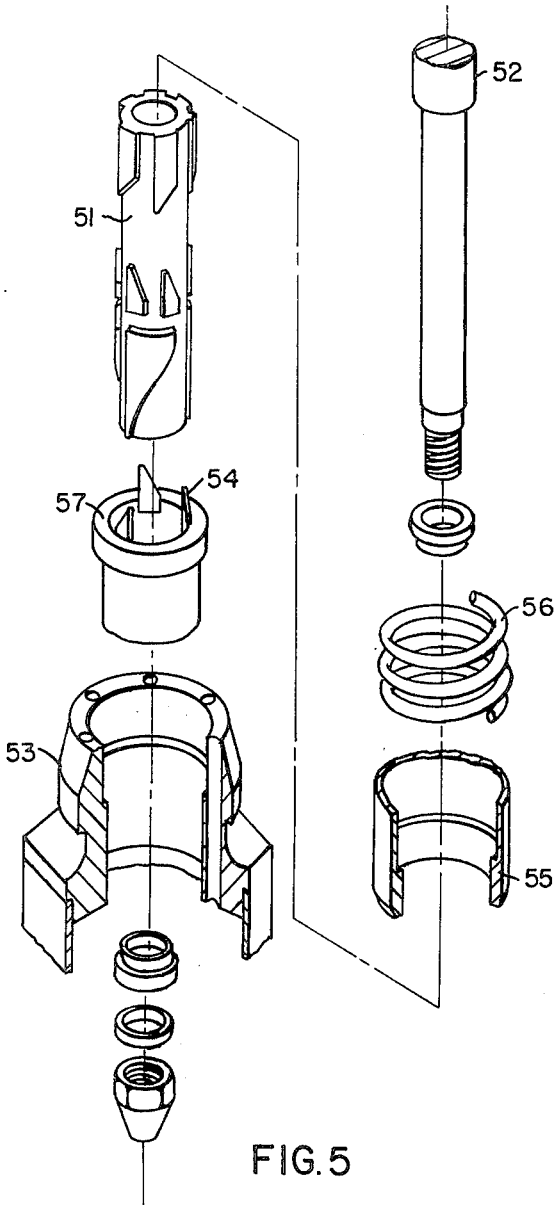
Figure 6:
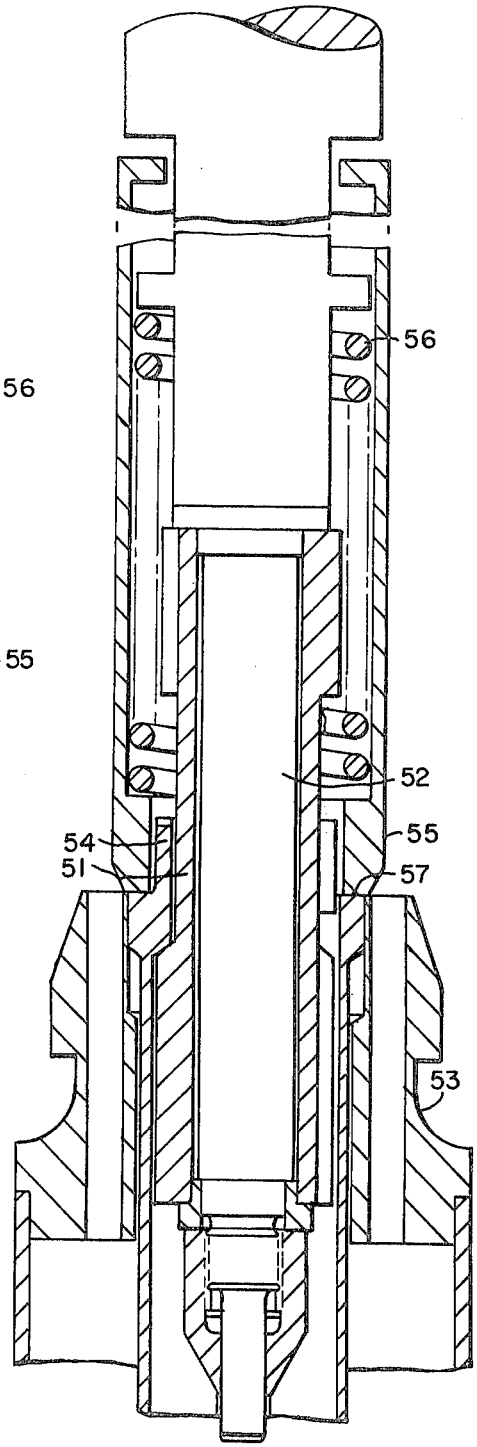
Figure 7:
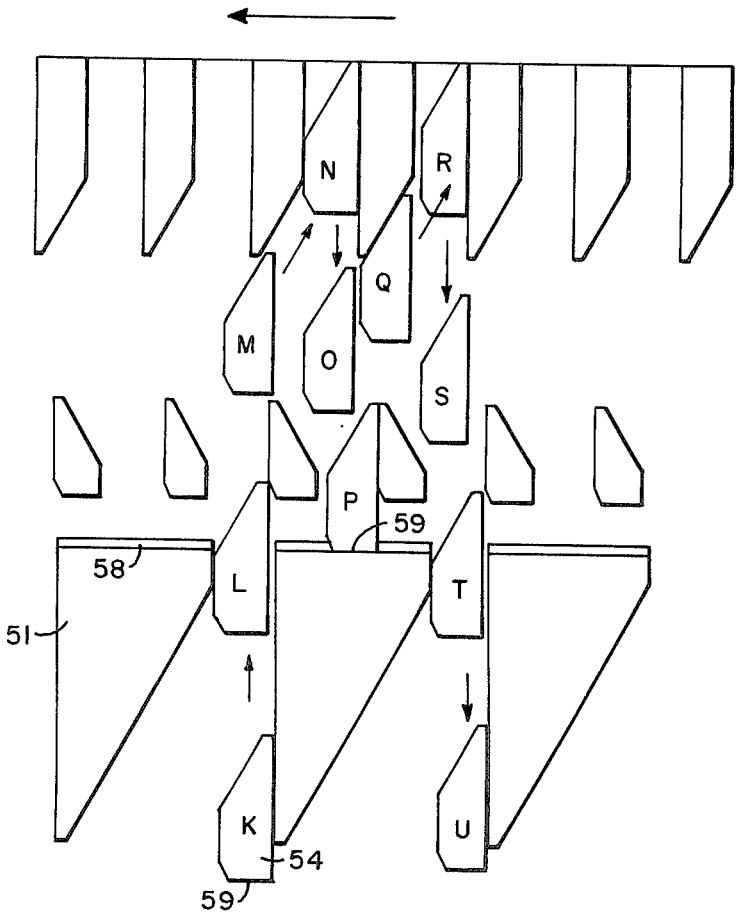

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 189

T942,002

CONTROL ROD FOR A NUCLEAR REACTOR

Walter G. Roman, 1316 Varner Road 15227, and Harry G. Sutton, Jr., 1313 Folkstone Drive 15243, both of Pittsburgh, Pa.

Filed Feb. 19, 1974, Ser. No. 443,885
**Int. Cl. G21c *7/08***
U.S. Cl. 176—36 R
5 Sheets Drawing. 21 Pages Specification

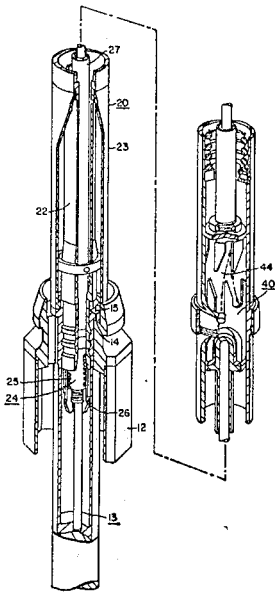

A control rod assembly for a nuclear reactor is disclosed having a remotely disengageable coupling between the control rod and the control rod drive shaft. The coupling is actuated by first lowering then raising the drive shaft. The described motion causes axial repositioning of a pin in a grooved rotatable cylinder, each being attached to different parts of the drive shaft which are axially movable relative to each other. In one embodiment, the relative axial motion of the parts of the drive shaft is used either to couple or to uncouple the connection by forcing resilent members attached to the drive shaft into or out of shouldered engagement, respectively, with an indentation formed in the control rod.